(12) United States Patent
Nguyen

(10) Patent No.: US 7,397,978 B1
(45) Date of Patent: Jul. 8, 2008

(54) APPARATUS AND METHOD FOR PACKAGING AND INTEGRATING MICROPHOTONIC DEVICES

(75) Inventor: Hung Nguyen, Lakewood, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 224 days.

(21) Appl. No.: 11/180,990

(22) Filed: Jul. 13, 2005

(51) Int. Cl.
*G02B 6/12* (2006.01)
(52) U.S. Cl. .................................. 385/14; 385/129
(58) Field of Classification Search ............ 385/14, 385/129
See application file for complete search history.

(56) References Cited

U.S. PATENT DOCUMENTS

| 5,903,380 | A | 5/1999 | Motamedi et al. | |
|---|---|---|---|---|
| 6,532,326 | B1 | 3/2003 | Hutchinson et al. | |
| 7,012,353 | B2 * | 3/2006 | Iwata | 310/316.01 |
| 2003/0194824 | A1 | 10/2003 | Hunt | |
| 2003/0223202 | A1 | 12/2003 | Uchida | |
| 2004/0021403 | A1 | 2/2004 | Ayazi et al. | |
| 2004/0057653 | A1 | 3/2004 | Fukuda et al. | |

| 2004/0065940 | A1 | 4/2004 | Ayazi et al. |
|---|---|---|---|

FOREIGN PATENT DOCUMENTS

WO     WO 03/005499 A3     1/2003

OTHER PUBLICATIONS

A. Sakai et al "FD TD Simulation of Photonic Devices and Circuits Based on Circular and Fan-Shaped Microdisks" Journal of Lightwave Technology, vol. 17, No. 8, pp. 1493-1499 Aug. 8, 1999.
D. S. Burgess "Photonic Crystal Laser Features Hexagonal Ring Resonator" Photonic Research, Dec. 2002 Edition, <http:/www.photonics.com/spectra/research/xQ/ASP/pre aid.56/QX/read.htm> (Sep. 29, 2004).
Ho et al "Making Photonic Devices 1000 Times Smaller"0 Science Blog; <http:/www.scienceblog.com/community/older/1997/A/199700917.html> (Sep. 30, 2004).

* cited by examiner

*Primary Examiner*—Jennifer Doan
(74) *Attorney, Agent, or Firm*—Gary Borda; Robert Rotella

(57) ABSTRACT

An apparatus is disclosed that includes a carrier structure and an optical coupling arrangement. The carrier structure is made of a silicon material and allows for the packaging and integrating of microphotonic devices onto a single chip. The optical coupling mechanism enables laser light to be coupled into and out of a microphotonic resonant disk integrated on the carrier. The carrier provides first, second and third cavities that are dimensioned so as to accommodate the insertion and snug fitting of the microphotonic resonant disk and first and second prisms that are implemented by the optical coupling arrangement to accommodate the laser coupling.

24 Claims, 11 Drawing Sheets

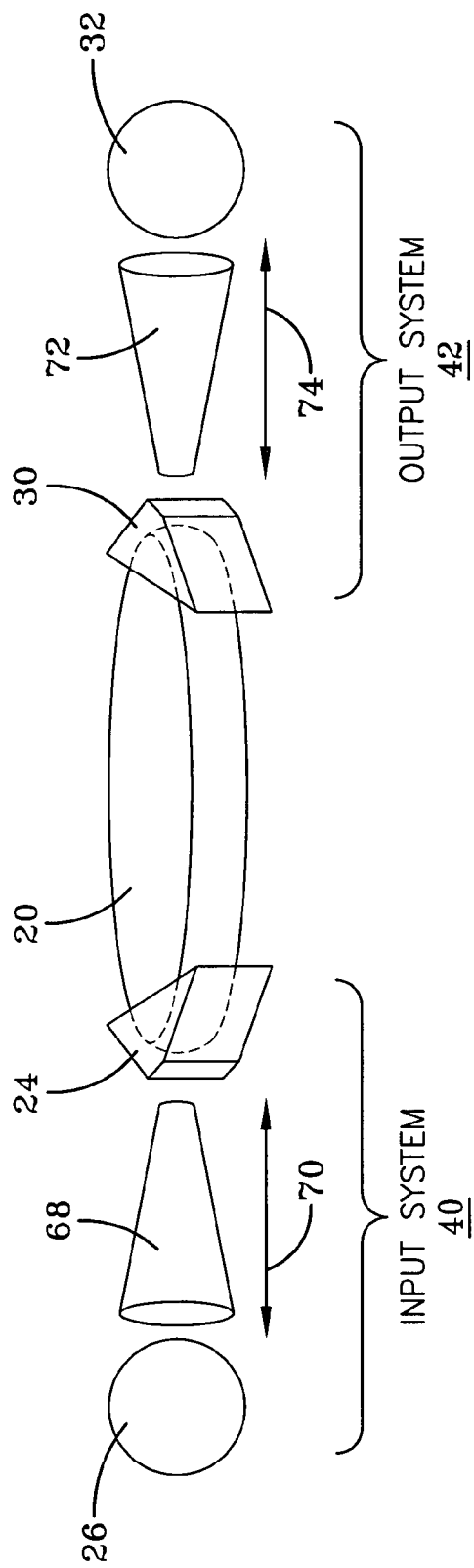
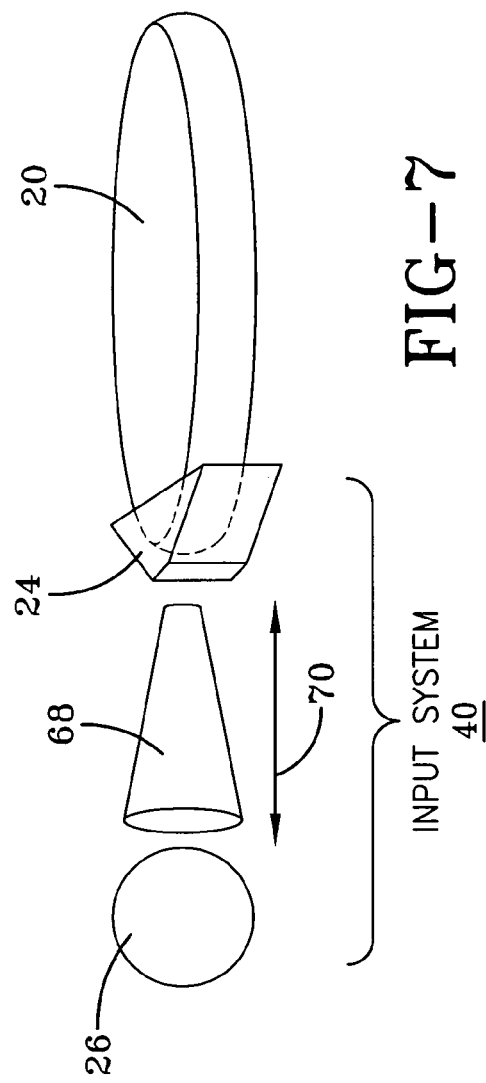

APPARATUS AND METHOD FOR PACKAGING AND INTEGRATING MICROPHOTONIC DEVICES

ORIGIN OF THE INVENTION

The invention described herein was made by an employee of the United States Government and may be used by or for the Government for governmental purposes without payment of any royalties thereon or therefore.

FIELD OF THE INVENTION

The present invention relates to photonics and optoelectronic devices and, more particularly, to packaging microphotonics and optoelectronic devices so that all of these devices will be integrated and interconnected onto a single chip or substrate.

BACKGROUND OF THE INVENTION

Microphotonics devices, such as microphotonic resonator disks, and other optoelectronic devices find wide application in microwave technology, such as in converting microwave data transmission having high data rates into optical signals compatible with optical fiber networks. For example, microphotonic resonant disks find application in microphotonic millimeter-wave receivers, based on Lithium Niobate resonator disk technology. Microphotonic resonator disks need to be interconnecting with other optical electronic devices in order to perform their desired operation and, in order to do so, optical coupling mechanisms or arrangements need to be provided.

Known optical coupling mechanisms currently being utilized for microdisk-based optical receivers use bulky components for coupling light, such as laser light, into microdisks and for decoupling laser light out of the microdisks. Since the optical coupling mechanisms are implemented with bulky components, these optical coupling mechanisms are not suitable for use in integrating and interconnecting all of the microphotonic components and optical devices embodied in, for example, microphotonic millimeter-wave receivers. It is desired that an optical coupling mechanism or arrangement be provided so that all of the optical electronic devices including the microphotonic resonator disk may be packaged and interconnected onto a chip or substrate and all such interconnected elements operatively cooperate with each other to form microphotonic systems, such as microphotonic millimeter-wave receivers.

The optical coupling mechanism or arrangement needs to be provided that allows for low-loss coupling of optical power into and out of the microphotonic resonant disk. In order to provide for the low-loss coupling, the optical coupling arrangement needs to accommodate laser light that is derived through indirect excitation of guided modes (GM) using evanescent fields, as known in the art. To accommodate the guided modes associated with evanescent fields, prisms are normally utilized. It is desired that the optical coupling arrangement accommodate prisms, as well as other optoelectronic devices, so that all devices are packaged and integrated onto a single chip or substrate and all such elements operatively cooperate with each other to provide microphotonic systems.

OBJECTS OF THE INVENTION

It is a primary object of the present invention to provide an apparatus for packaging and integrating microphotonic optical devices comprising a carrier and an optical coupling arrangement, so that all microphotonic devices are interconnected and carried on a chip or substrate and all such microphotonic devices operatively cooperate with each other to form microphotonic systems.

It is a further object of the present invention to provide for an optical coupling arrangement that enables low-loss coupling of laser light into and out of a microphotonic resonator disk.

It is a further object of the present invention to provide for an apparatus that includes means for tuning and adjusting prisms so as to achieve maximum coupling of laser light to and from the microphotonic resonator disk.

SUMMARY OF THE INVENTION

The invention is directed to an apparatus that provides for packaging and integrating microphotonic devices onto a chip or substrate.

The apparatus for packaging and integrating microphotonic optical devices comprises a carrier and an optical coupling arrangement. The carrier has a wafer with a predetermined thickness and provides a top surface for supporting an electrode. The carrier comprises $a_1$) a first cavity having a curved surface with a first portion thereof located near the electrode, the cavity having a predetermined shape and predetermined dimensions; $b_1$) a second cavity having a predetermined shape and a predetermined dimensions, the second cavity having a curved surface with a portion thereof in alignment with a second portion the curved surface of the first cavity; $c_1$) a third cavity having a predetermined shape and predetermined dimensions, the third cavity having a curved surface with a portion thereof in alignment with a third portion of the curved surface of the first cavity; $d_1$) a first groove having a predetermined shape and a predetermined depth and running along the surface of the wafer and intercepting the second cavity at a first location thereat; and $e_1$) a second groove having a predetermined shape and a predetermined depth and running along the top surface of the wafer and intercepting the third cavity at a first location thereat.

The optical coupling arrangement of the apparatus comprises: $a_2$) a resonator disk dimensioned to snugly fit into the first cavity; $b_2$) a first prism dimensioned to snugly fit into the second cavity; $c_2$) a second prism dimensioned to snugly fit into the third cavity; $d_2$) a first collimating fiber dimensioned to snugly fit into and run along and occupy the first groove; and $e_2$) a second collimating fiber dimensioned to snugly fit into and run along and occupy the second groove.

BRIEF DESCRIPTION OF THE DRAWINGS

For a better understanding of the nature and objects of the present invention, reference should be made to the following detailed description taken in conjunction with the accompanying drawings, wherein like parts are given like reference numbers, and wherein:

FIG. 6 is a block diagram illustrating some of the parameters associated with the coupling of laser beam to and from the microphotonic resonator disk associated with the present invention;

FIG. 7 illustrates parameters associated with the input system for coupling laser light into the microphotonic resonator disk associated with the present invention;

DETAILED DESCRIPTION OF THE PREFERRED EMBODIMENTS

Figure 1:
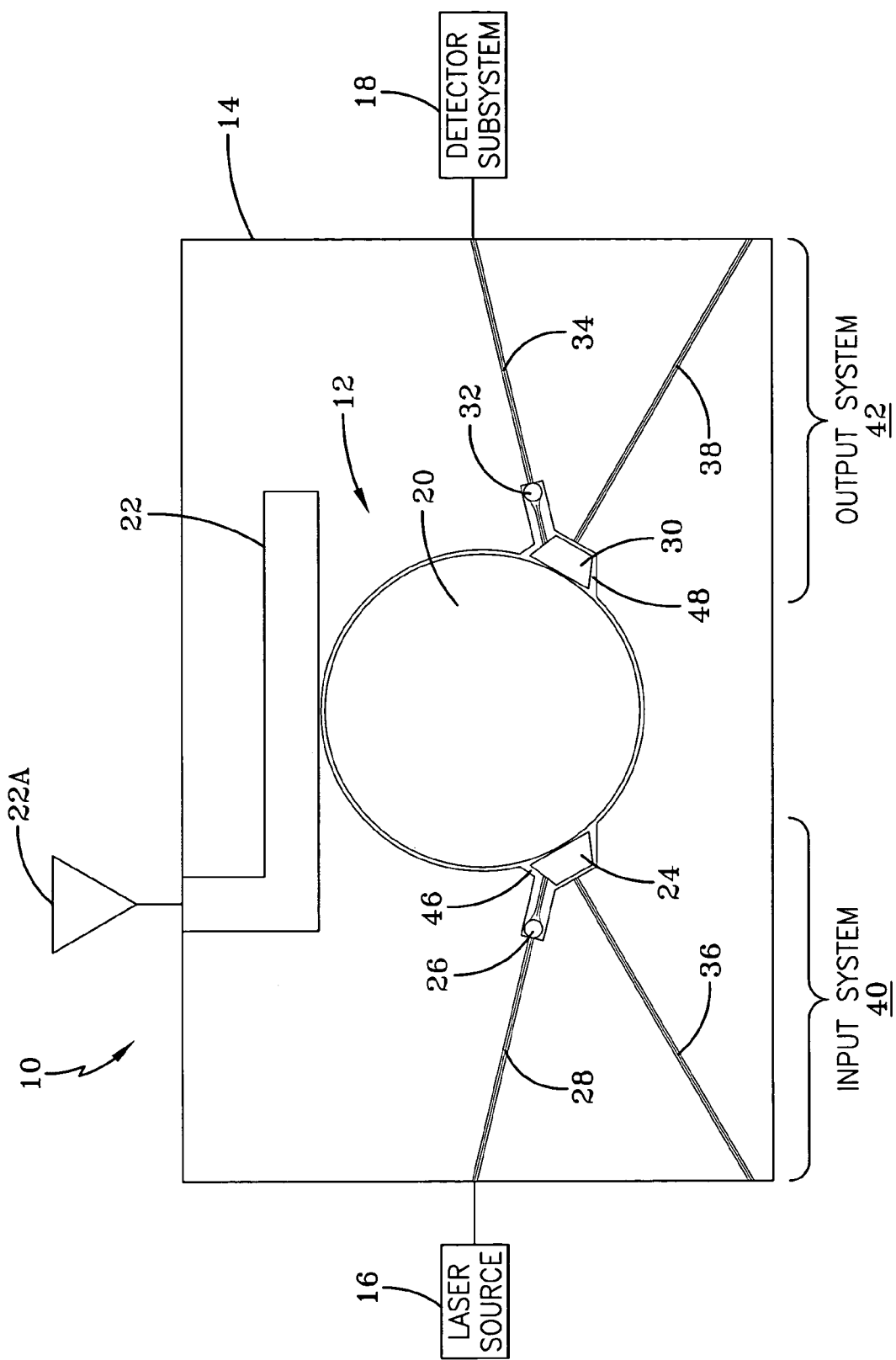
FIG. 1 is a schematic of the apparatus of the present invention used for packaging and integrating microphotonic optical devices onto a single chip or substrate.

Referring to the drawings, there is shown in FIG. 1, a schematic of an apparatus 10 used for packing and integrating microphotonic optical devices comprising an optical coupling arrangement 12 and a carrier 14. Microphotonic, photonics, and optical electronics are terms used in the art to describe interactions between optical and electronic physical phenomena. This phenomenon can involve the transforming of electrical signals into optical signals or the reverse. It can also involve the modulation of electronic signals by interaction with the optical signals or the reverse.

The optical coupling arrangement 12 assists in transferring received RF energy made available, for example, at laser source 16 into light streams comprising optical information, which may be forwarded to a further optical network comprising a detection subsystem 18 shown in FIG. 1.

In the embodiment of FIG. 1, a microphotonic resonator disk 20 preferably comprised of Lithium Niobate has an outwardly curved surface, as seen in FIG. 1, with a portion thereof that is located near an electrode 22 for a microphotonic milliwave wave receiver. The top surface of the carrier 14, in particular, a top portion 14A thereof to be further described hereinafter with reference to FIG. 2, provides support for the electrode 22.

The optical coupling arrangement 12 couples and decouples light streams from the resonator disk 20 and comprises a first prism 24, preferably a first focusing lens 26, which may be of a ball type lens, a first collimating fiber 28, a second prism 30, preferably a second focusing lens 32, which may be of a ball type lens, and a second collimating fiber 34. Preferably the optical coupling arrangement 12 further comprises first and second prism tuning rods 36 and 38. The apparatus 10 is shown in FIG. 1, as having an input system 40 and an output system 42, both to be further described hereinafter with reference to FIGS. 6 and 7.

The carrier 14 of the apparatus 10 further comprises a first cavity 44 (not shown in FIG. 1, but to be described with reference to FIG. 2), a second cavity 46, and a third cavity 48, wherein both cavities 46 and 48 preferably have a trapezoidal shape so as to respectively accommodate the insertion and snug fitting of the first and second prisms 24 and 30. The carrier 14 may be further described with reference to FIG. 2, which is composed of FIGS. 2A, 2B, 2C and 2D.

Figure 2A:
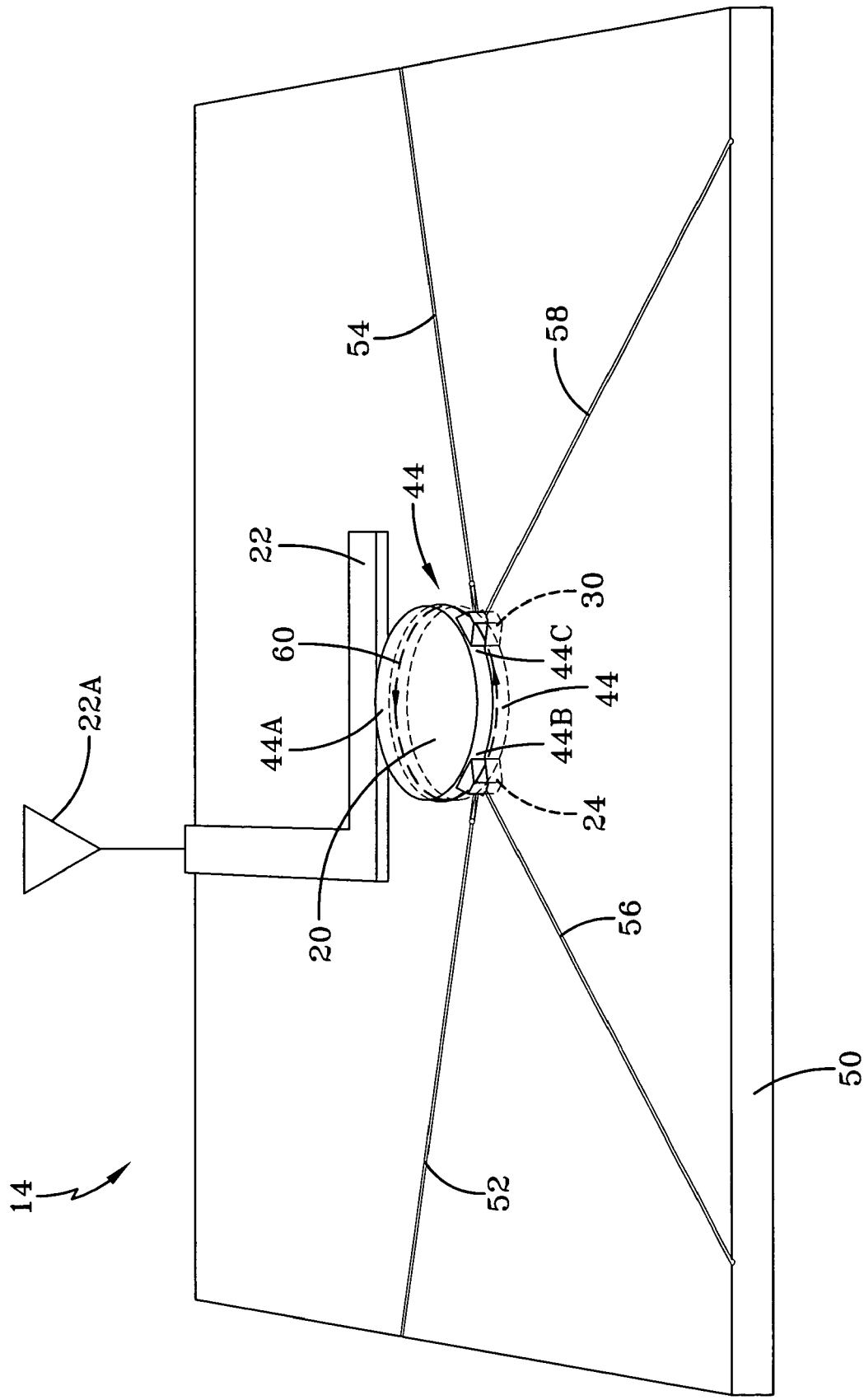
FIG. 2 is composed of FIGS. 2A, 2B, 2C and 2D each showing details of the carrier of the present invention.

The first cavity 44 shown in FIG. 2A, has an outwardly curved surface having at least first, second and third portions 44A, 44B, and 44C, wherein the first portion 44A is located near the electrode 22 having an antenna 22A coupled thereto, the second portion 44B abuts against the second cavity 44, and the third portion 44C abuts against the third cavity 46. The first portion 44A may be further described with reference to FIG. 2B.

Figure 2B:
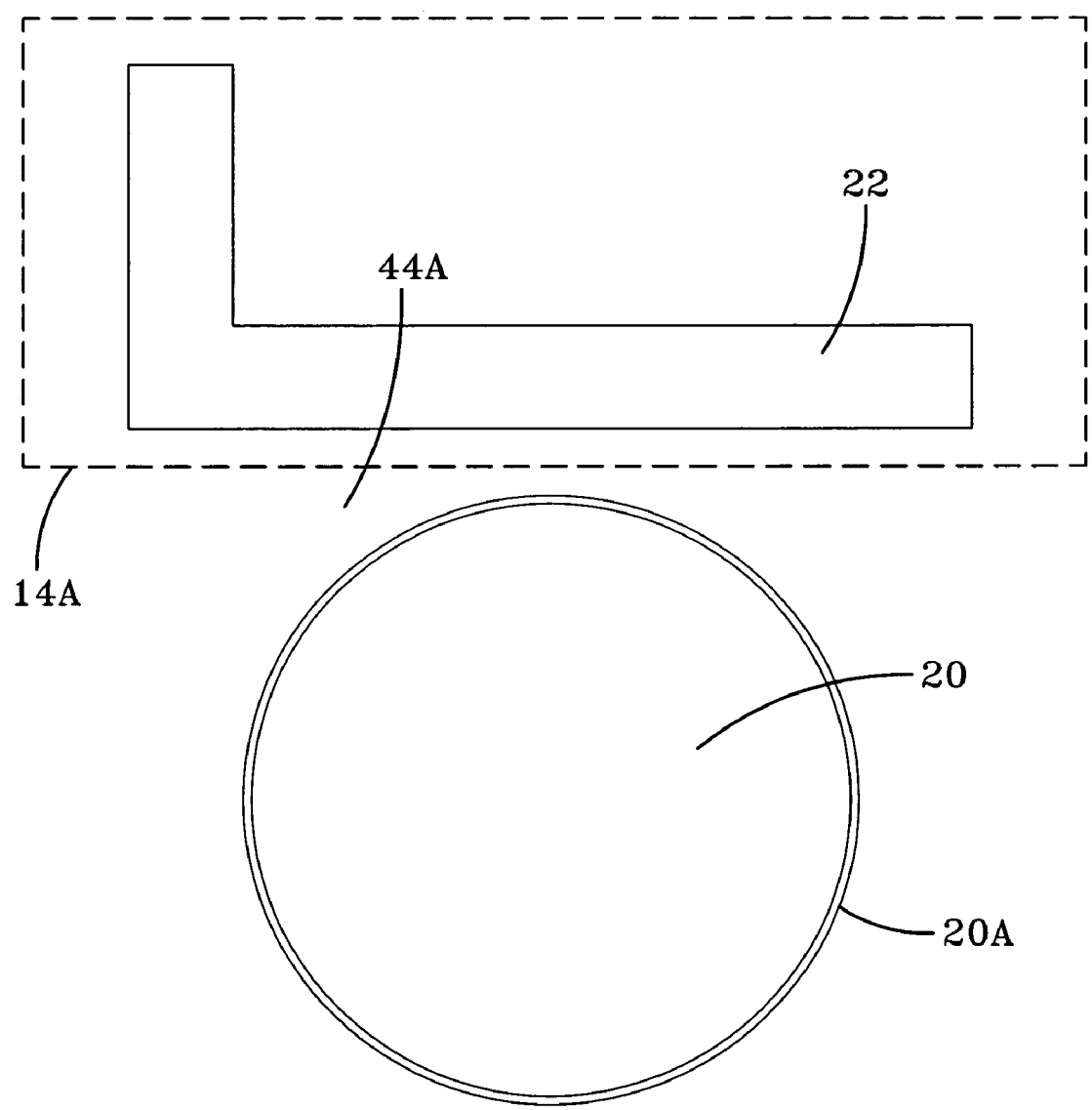

FIG. 2B is a top view showing the resonator disk 20 as having an electrode 20A located at the outer circumference of the resonator disk 20. The electrode 20A may be attached to the resonator disk 20 by suitable means such as gluing, or may be deposited on the resonator disk 20 by a gold evaporation process in a manner known in the art. FIG. 2B also illustrates the electrode 22, having a typical thickness of 10 um, as resting on a top portion 14A of the carrier 14, and which may be further described with reference to FIG. 2C.

Figure 2C:
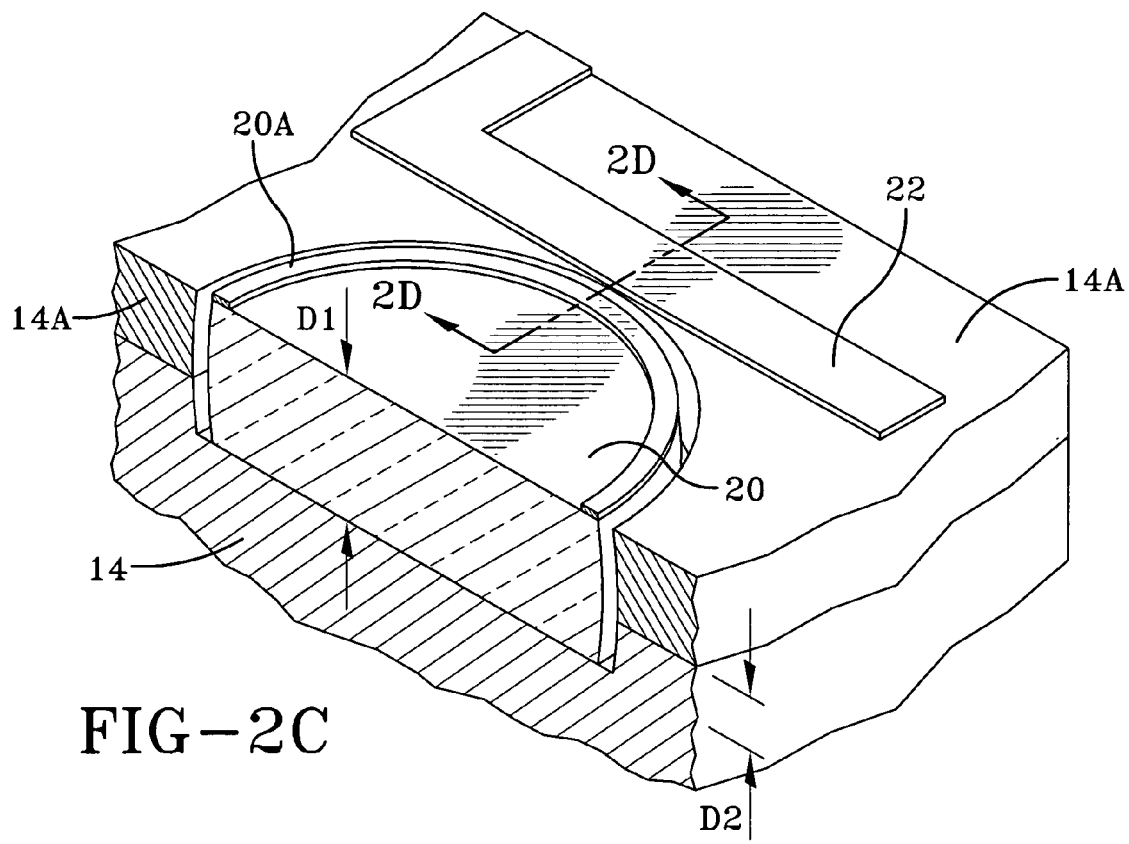

FIG. 2C is a partial cutaway that primarily illustrates the portion 14A, which is preferably composed of silicon and has a thickness that is selected to match the height D1 of the resonator disk 20 and the depth D2 of the first cavity 44, so that the electrode 22 is substantially at the same height or plane as the top surface of the resonator disk 20 carrying the electrode 20A. More particularly, the portion 14A has a thickness of about 150 um to match the height D1 of the resonator disk 20 having a typical value of 200 um minus the depth D2 of the first cavity 44 having a typical value of about 50 um. The silicon composition of the portion 14A is selected to provide desired coupling between the electrodes 20A and 22 in a manner known in the art. The matching or alignment between the electrodes 20A and 22 may be further described with reference to FIG. 2D.

Figure 2D:
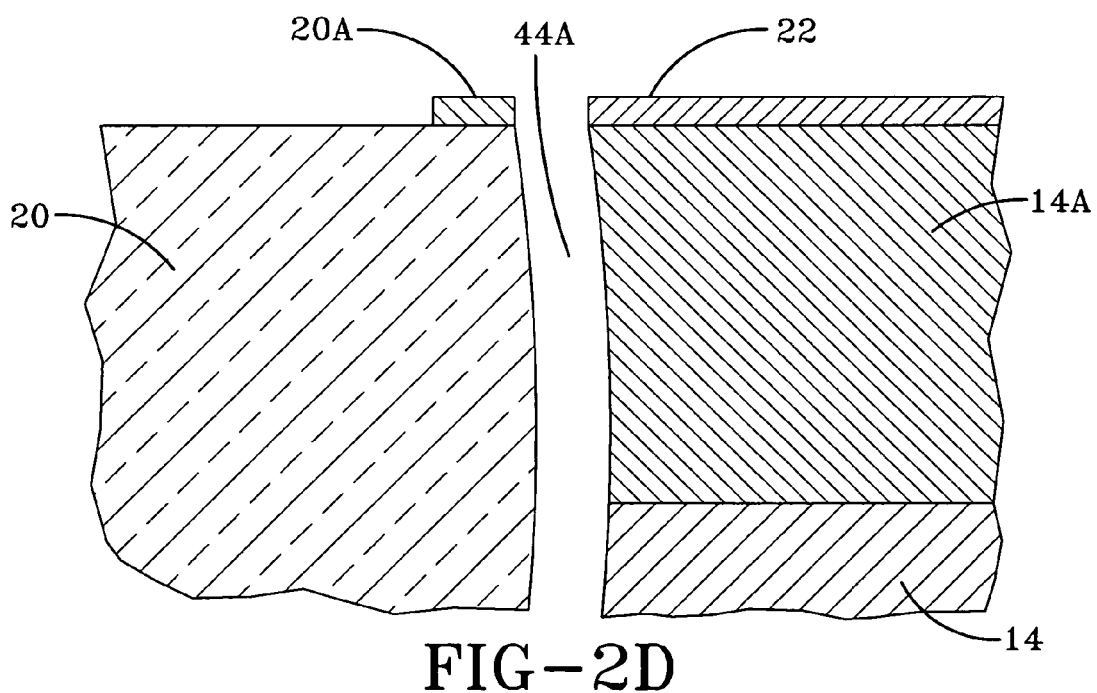

FIG. 2D is a partial cutaway primarily illustrating that the electrode 22, resting on the portion 14A of the carrier 14, is in alignment with the electrode 20A of the resonator disk 20 so that proper coupling between the electrodes 22 and 20A occurs along the first portion 44A of the cavity 44.

The carrier 14, on which the resonator disk 20 and electrode 22 are lodged, comprises a wafer 50 which is preferably composed of silicon, and has a thickness of about 0.5 mm. The first cavity 44 is dimensioned so as to allow the resonated disk 20 to snugly fit therein and, for one embodiment, has typical dimensions of a diameter of about 5 mm and a depth D2 of about 50 um, as previously discussed. The second and third cavities 46 and 48 (shown in FIG. 1) preferably have a trapezoidal shape and having typical dimensions of a base of about 1.1 mm, and a top opening (as viewed in FIG. 1) of about 0.6 mm. These dimensions for the first and second cavities 46 and 48 accommodate the respective insertion and snug fitting therein of prisms 24 and 30, each having typical dimensions of 1.0×0.5×0.5 mm.

The carrier 14 further comprises a first groove 52 and a second groove 54, each preferably having a U-shape and a depth of about 250 um. The carrier 14 preferably further comprises third and fourth grooves 56 and 58 each preferably having a width of about 0.3 mm. The dimensions for the first, second, third, and fourth grooves 52 and 54, 56 and 58, are respectively selected so as to allow the insertion and snug fitting of first collimating fiber 28 and ball lens 26; the second collimating fiber 34 and ball lens 32; the first prism tuning rod 36, and the second prism tuning rod 38. The first and second ball lenses 26 and 32 respectively, each has a typical radius of curvature of about 0.230 mm.

In general, and with simultaneous reference to FIGS. 1 and 2, the operation of the apparatus 10 is that light, preferably laser, enters the apparatus 10 from the laser source 16, or some other means known in the art, and is conducted by the collimating fiber 28 and focused by the ball lens 26 onto the first prism 24, which splits the laser light and causes it to travel around the perimeter of the resonator disk 20, not through it. The light path around the perimeter of the resonator disk 20 is shown as signal path 60. The resonator disk 20 transfers the received light stream from prism 24 to the electrode 22 at location 44A and forwards the remaining light streams to prism 30, where the light streams are decoupled and then transferred, via the optical fiber 54, to the detector subsystem 18, or some other optical network.

The apparatus 10 provides a single substrate or chip 50, serving as carrier 14, for the packaging and integrating of all the microphotonic devices, such as the microphotonic resonator disk 20 and the millimeter-wave resonator electrode 22. The microphotonic resonator disk 20 and the millimeter-wave resonator electrode 22 operatively cooperate with each other, in a manner known in the art, to perform their operations and serve as a microphotonic millimeter-wave receiver, which preferably is based on Lithium Niobate resonator disk technology. Further details of the signal path 60 and the first and second prisms 24 and 30 may be further described with reference to FIG. 3.

Figure 3:
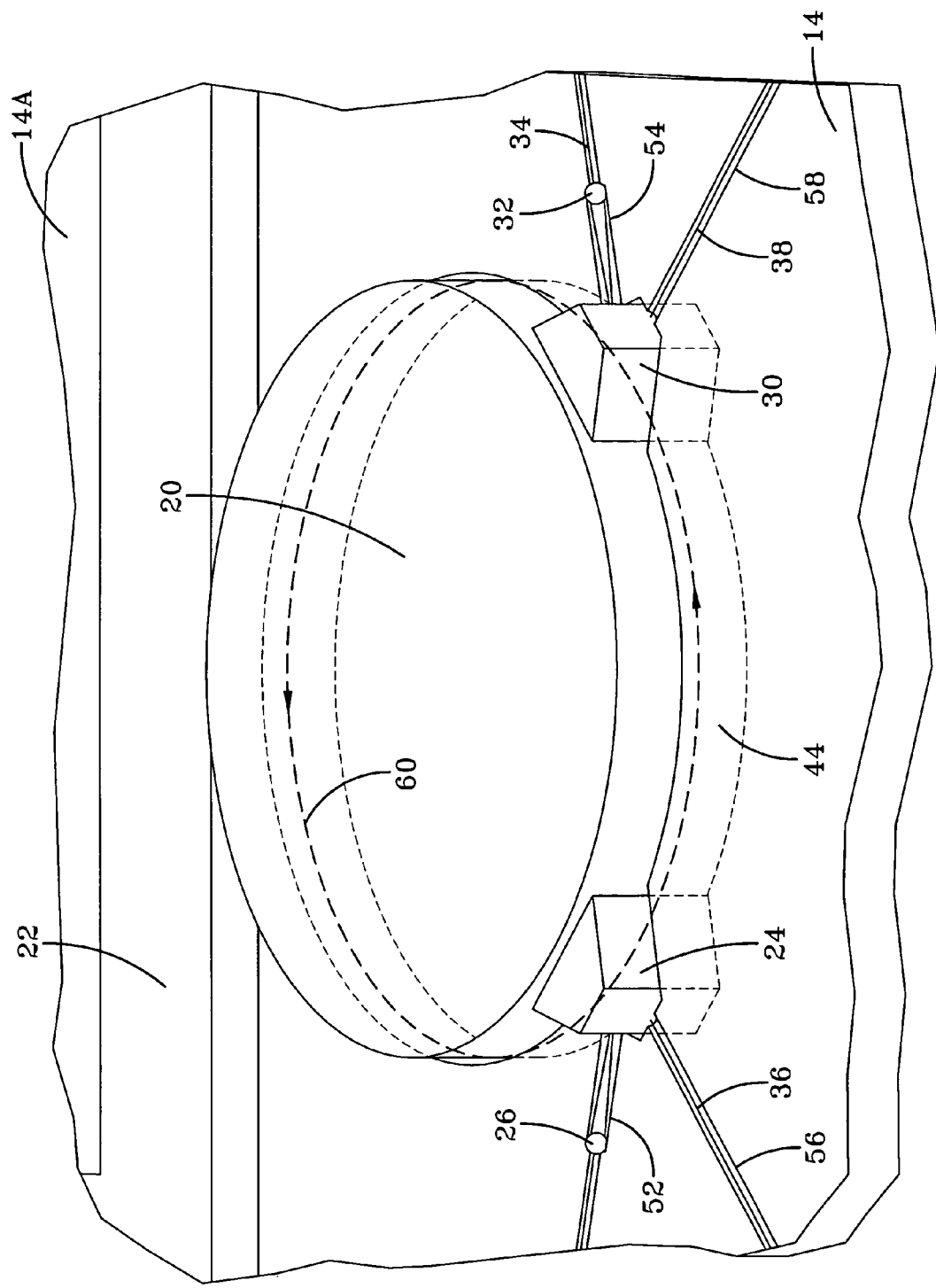
FIG. 3 primarily illustrates details associated with the first cavity of the carrier of the present invention.

As seen in FIG. 3, the basic geometry of the carrier 14, in particular, the first cavity 44 is that it possesses a curved-side wall, previously mentioned, in order to allow the resonator disk 20 to snugly fit therein. In order to enable low-loss coupling of optical power, both into and out of the resonator disk 22, it needs to be recognized that laser light cannot be excited directly by just directly propagating a beam into the resonator disk 20, because, unlike direct propagation, the laser light is only achieved through indirect excitation of guided modes using evanescent fields, as known in the art. The need for the indirect excitation mandates the use of prisms for evanescent coupling of light into guided modes. The present invention provides for the implementation of the prisms, such as the first and second prisms 24 and 30, shown in FIG. 3 as each being intercepted by the signal path 60 of the laser light. All of the dimensions of the first, second, and third cavities, as well as the first, second, third, and fourth grooves, may be varied to accommodate different devices, such as a different resonator disk 20, and all such dimensions may be provided through conventional etching process associated with the substrate 50 known in the art. Further details of the signal path 60 intercepting the prisms 24 and 30 may be further described with reference to FIG. 4.

Figure 4A:
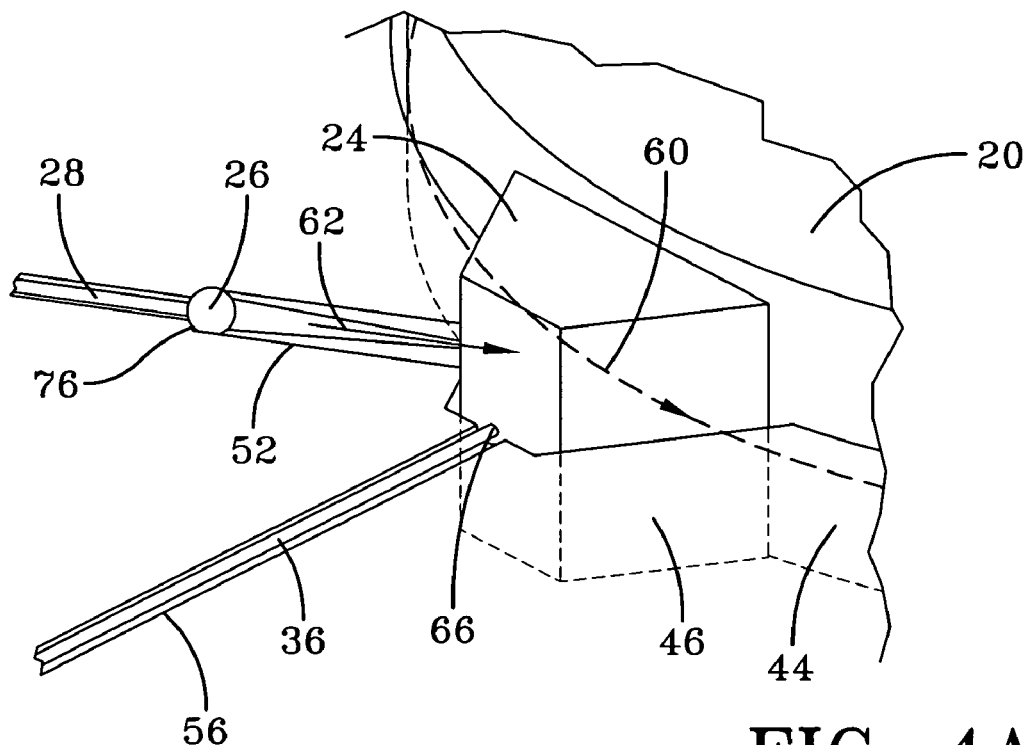
FIG. 4 is composed of FIGS. 4A and 4B that respectively illustrates further details of the second and third cavities of the carrier of the present invention and in which each cavity is used to accommodate a prism associated with the optical coupling arrangement of the present invention.
Figure 4B:
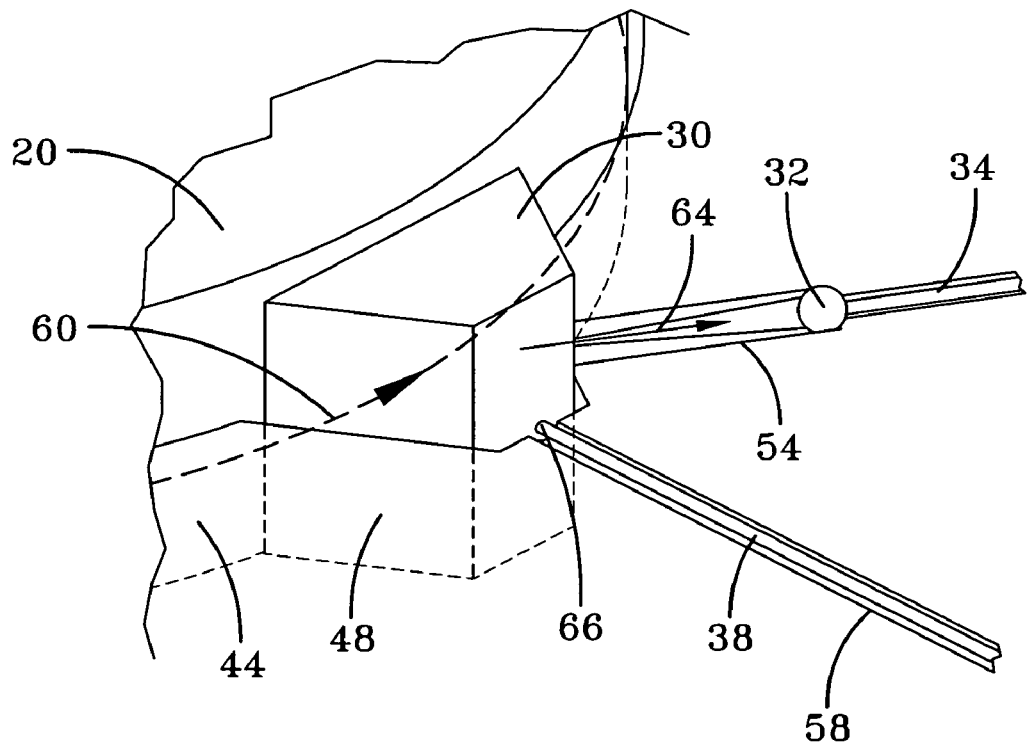

FIG. 4 is composed of FIGS. 4A and 4B, wherein FIG. 4A illustrates the laser signal path 60 as intercepting prism 24 wherein laser light is added to the signal path 60 and is shown by directional arrow 62 being directed from the first collimating fiber 28 and the first ball lens 26, all located and lodged in the first groove 52. FIG. 4B illustrates the laser signal path 60 as having laser light subtracted or removed therefrom as indicated by directional arrow 64, wherein the subtracted laser light is delivered to the second ball lens 32 and then to the second collimating fiber 34, both lodged within the second groove 54. It should be recognized that if desired, but not preferred, the first and second ball lens may be removed and the first and second collimating fibers 28 and 34 may be extended in length so as to directly add and remove laser light from the laser signal path 60. Further details of prism 30 may be further described with reference to FIG. 5.

Figure 5:
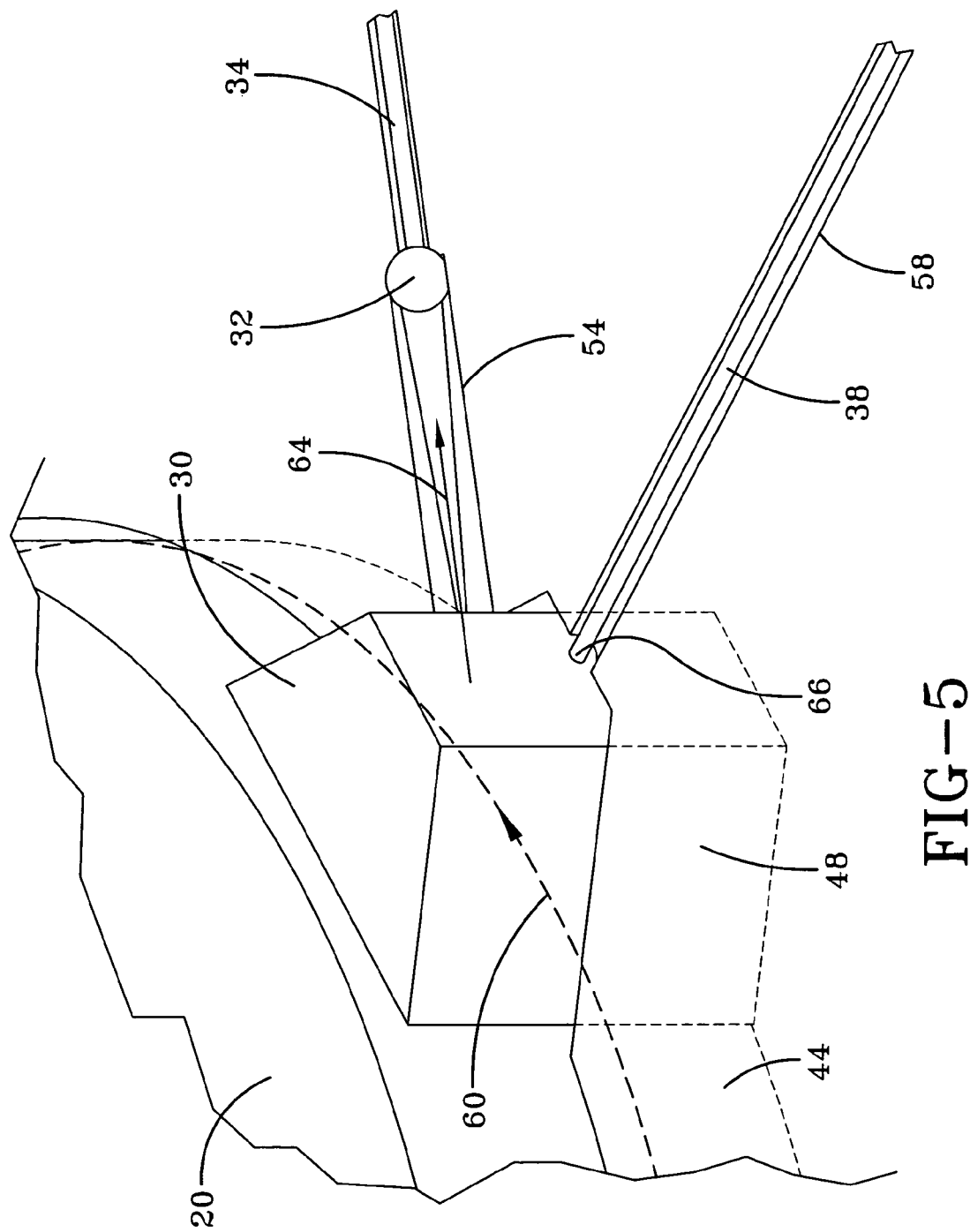
FIG. 5 illustrates further details associated with the prisms utilized by optical coupling arrangement of the present invention.

FIG. 5 is similar to FIG. 4, with the exception that FIG. 5 illustrates that the second prism tuning rod 38 as extending into the third cavity 48, and abutting against the second prism 30, as shown at location 66. This abutment is also applicable to the first prism tuning rod 36 that abuts up against the first prism 24, as shown in FIG. 4A at location 66 thereat. The purpose of the first and second prism tuning rods 36 and 38 is to respectively keep the base of the prism 24 and 26 tangent to the surface of the resonator disk 20. The parameters for the etching of the third and fourth grooves 56 and 58 into the substrate 50 are respectively selected so that the first and second prism tuning rods 36 and 38 snugly fit therein and are in alignment with the prism 24 and 30 respectively, so that desirable positions are provided for prism tuning rods 36 and 38 to maximize the optical coupling from the prism 24 and 30 into and out of the resonator disk 20. These desirable positions will be further described hereinafter with reference to the FIGS. 6 and 7.

Further, FIG. 6 illustrates that the input system 40 has a precise focal distance 70 that will be further described hereinafter with reference to FIG. 7. The distance 70 is a measurement between the first ball lens 26 and the first prism 24.

FIG. 6 also illustrates that the output system 42 has similar parameters as the input system 40, that is, a optical beam profile 72, having the same needs as optical beam 68 and the focusing distance between the second prism 30 and the second ball lens 32 as identified with reference number 74, which has the same needs as the focusing distance 70. Focusing distance 70, as well as the beam profile 68 of the input system 40, may be further described with reference to FIG. 7.

Figure 8:
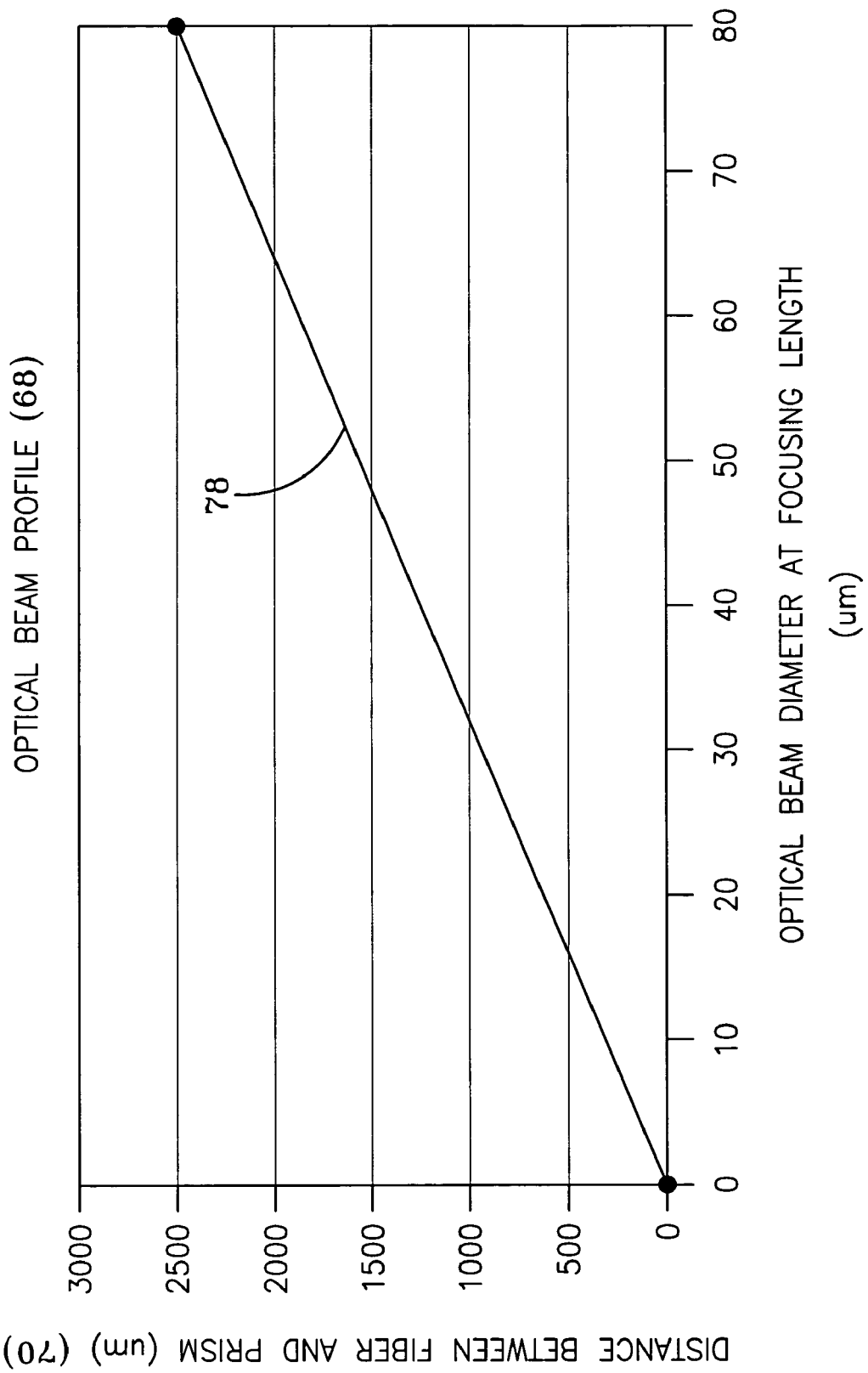
FIG. 8 illustrates the parameters associated with accommodating an optical beam profile associated with a laser light accommodated by the practice of the present invention.

The distance 70, shown in FIG. 7, is dependent on the parameters of the ball lens 26, optical beam profile 68, and the height of the resonator disk 20. For example, for a resonator disk 20 having a height of 200 um, and for a ball lens 26 serving as a collimating fiber, having a typical radius curvature of 230 um, the practice of the present invention reveals that in order to obtain the beam diameter of 60 um for beam profile 68, the required distance between a ball lens 26 and prism 24 should be about 1700 um. This is the distance in which a taper reference 76 on the fiber groove 52 (see FIG. 4A) is set so as to eliminate an alignment process between fiber and prism. Further, desired distances 70 relative to different optical beams 68 are illustrated in FIG. 8 by plot 78.

Figure 9:
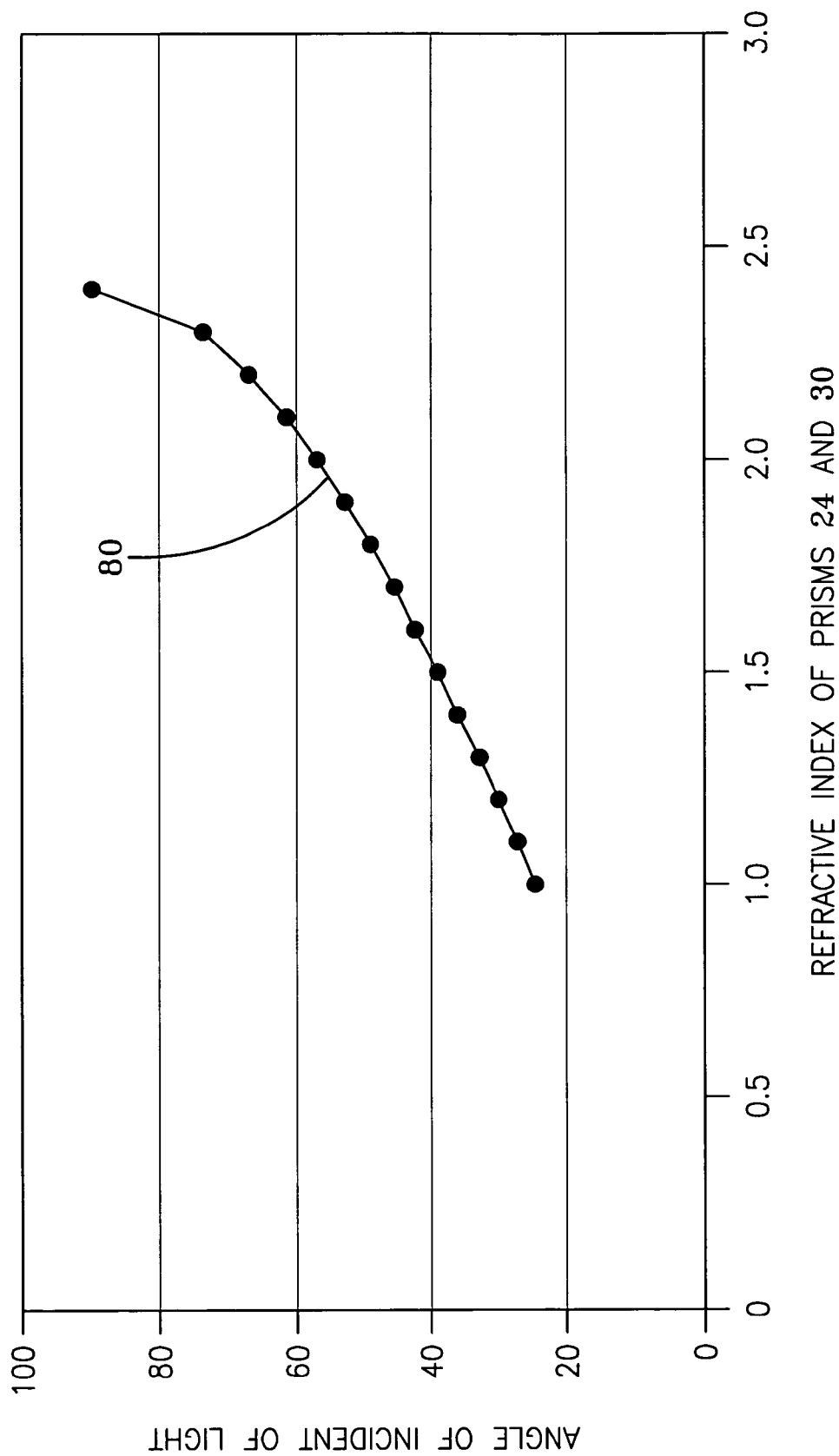
FIG. 9 illustrates details associated with a phase matching of the various components interfacing with laser light handled by the practice of the present invention.

The coupling between prisms 24 and 30, applicable to the input and output systems 40 and 42, respectively, need to take into account the refractive index ($n_{prism}$) of each prism 24 and 36 and with the resonator disk 20 having an index ($n_{disk}$) because such coupling is dependent on total internal reflection of the prisms 24 and 36, as well as the resonator disk 20. The prominent component of the propagation constant lies along the annulus of the resonator disk 20 for the high guided modes that the practice of this invention is interested in exciting. To phase match with these high guided modes, the angle of incidence of light with respect to the normal of the coupling face of each prism 24 and 30, should be at an angle greater than or equal to $\theta = \arcsin(n_{disk}/n_{prism})$. Further, desired angle of incidence of light relative to the reflective index of prisms 24 and 36 are illustrated in FIG. 9 for curve 80.

In one embodiment, wherein the index of the resonator disk 20 is 2.14, the angle of incidence varies when different values of refractive index of prisms 24 and 30 are applied. For a diamond prism that may be used for each prism 24 or 36, the angle of incidence is desired to be about 63 degree since the refractive index of diamond is at 2.4. For a preferred embodiment, it is desired that an angle of the first and second grooves 52 and 54 with respect to the normal of the prisms 24 and 36 should be about 63 degrees, and may be further described with reference to FIG. 10.

Figure 10:
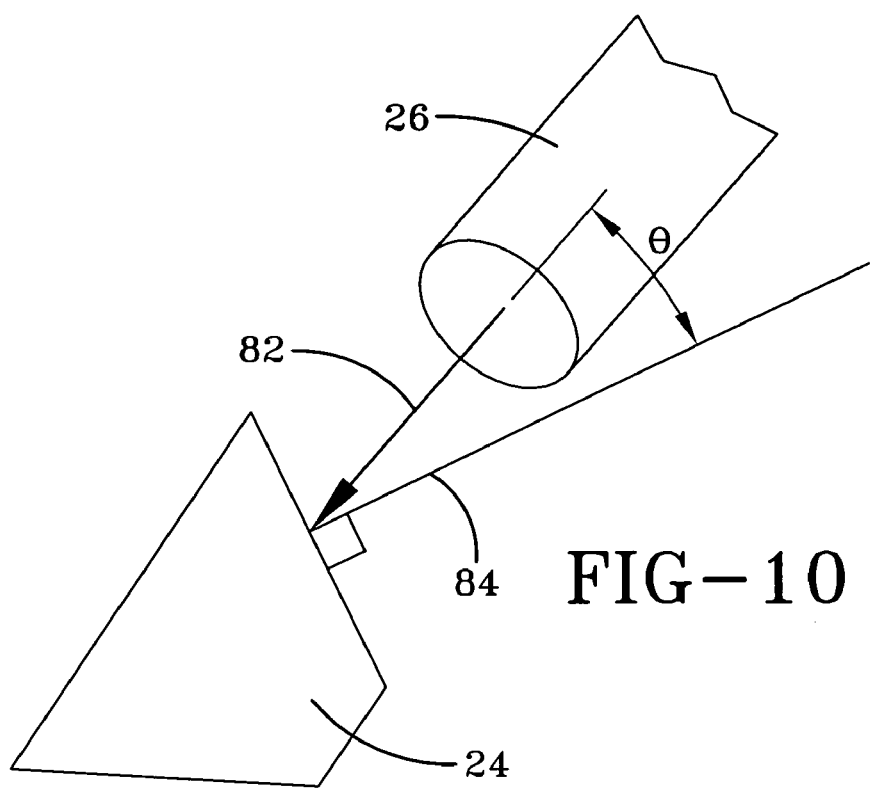
FIG. 10 further illustrates the interpositioning between the prisms and the collimating fibers utilized by the present invention.

FIG. 10 illustrates that the laser light exiting ball lens 26 is at an angle of incident 82 and intercepts the prism 24. The prism 24 has a tangent 84 at the face of the prism 24 associated with and facing the ball lens 26. As previously mentioned, for one embodiment, it is desired that the angle of incidence be at 63 degrees and which may be further described with reference to FIG. 11.

Figure 11:
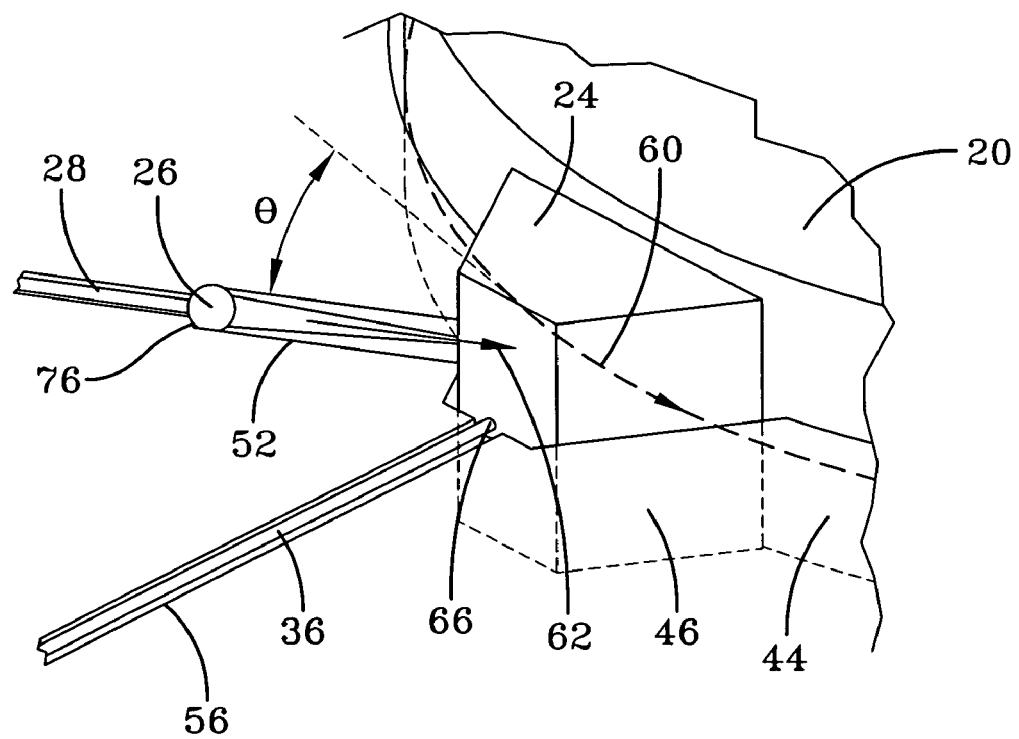
FIG. 11 illustrates the interpositioning between the collimating fiber and the microphotonic resonator disk associated with the present invention.

FIG. 11 shows that the ball lens 26 is arranged at an angle θ preferably having a value of 63 degrees and such arrangement is provided by the first groove 52 having a reference notch 76, previously discussed with reference to FIG. 4A. By precisely setting the groove 52 for the focusing lens 26 in a manner as discussed, the conventional alignment process between the incoming laser and the prism is eliminated.

The above descriptions of FIGS. 10 and 11 for prism 24 interfacing with ball lens 26, are equally applicable to prism 36 interfacing with ball lens 32.

It should now be appreciated that the present invention provides for both a carrier structure and an optical coupling arrangement, all being lodged and interconnected on a single chip or substrate. The optical coupling arrangement 12 enables a laser light to be coupled into the microphotonic resonator disk 20, decoupled out of the microphotonic resonator disk 20, and into the output ball lens 32. The basic geometry of the carrier 14 consists of a curve-side wall cavity preferably having a diameter of 5 millimeters and a 50 um depth, which allows for the securing of the microphotonic resonator disk 20 therein. Adjoining the first curve cavity are the second and third cavities shaped as trapezoidal figures and dimensioned to snugly hold prisms in place. The prisms are needed for coupling the optical beam into and out of the microphotonic resonator disk. In addition, there are two rectangular first and second grooves, with a depth of 50 um that intersect the top and side faces of each prism. A first groove leads into the prism and is used to affix not only a collimating fiber, but also a ball lens. The first groove has a taper reference that not only provides for the alignment of the ball lens relative to the prism, but also obtains a desired focal length. The third and fourth grooves allow for securing mechanical prism tuning rods that adjust the prism so that the base of the prism is tangent to the curvature of the microphotonic resonant disk. The overall benefits of the carrier, as well as the optical coupling arrangement, enables integration of a resonant disk onto a chip or substrate and provides low optical insertion loss, while allowing for device minimization and eliminates any manual alignment between the associated fibers and the prism with the overall effect reducing assembly costs.

The invention has been described with reference to preferred embodiments and alternates thereof. It is believed that many modifications and alterations to the embodiments as described herein will readily suggest themselves to those skilled in the art upon reading and understanding the detailed description of the invention. It is intended to include all modifications and alterations insofar as they come within the scope of the present invention.

I claim:

1. A carrier particularly suited for microphotonic devices and having a wafer with a predetermined thickness and providing a top surface for supporting an electrode, said carrier comprising:
   a) a first cavity having a curved surface with first, second and third portions all interconnected with each other in the closed loop manner, said first portion thereof located near said electrode, said first cavity having predetermined dimensions;
   b) a second cavity having predetermined dimensions, said second cavity having a curved surface with a portion thereof in alignment with said second portion of said curved surface of said first cavity;
   c) a third cavity having predetermined dimensions, said third cavity having a curved surface with a portion thereof in alignment with said third portion of said curved surface of said first cavity;
   d) a first groove having a predetermined shape and a predetermined depth and running along said top surface of said wafer and intercepting said second cavity as a first location thereat; and
   e) a second groove having a predetermined shape and a predetermined depth and running along said top surface of said wafer and intercepting said second cavity as a first location thereat.

2. The carrier according to claim 1, further comprising:
   f) a third groove having a predetermined shape and predetermined dimensions and running along said top surface of said wafer and intercepting said second cavity at a second location thereat, and
   g) a fourth groove having a predetermined shape and predetermined dimensions and running along said top surface of said wafer and intercepting said third cavity at a second location thereat.

3. The carrier according to claim 1, wherein:
   said wafer is composed of silicon and has a thickness of about 0.5 mm;
   said first cavity is dimensioned to have a diameter of about 5 mm and a depth of about 50 um;
   said second cavity is dimensioned to have a trapezoidal shape and dimensions of a base of about 1.1 mm, and a top opening of about 0.6 mm;
   said third cavity is dimensioned to have a trapezoidal shape and dimensions of a base of about 1.1 mm, and a top opening of about 0.6 mm;
   said first groove has a U-shape and a depth of at least about 250 um;
   said second groove has a U-shape and a depth of at least about 250 um;
   said third groove has a width of at least about 0.3 mm;
   said fourth groove has a width of at least about 0.3 mm.

4. An apparatus for packaging and integrating microphotonic optical devices comprising a carrier and an optical coupling arrangement, said carrier having a wafer with a predetermined thickness and providing a top surface for supporting a first electrode, said carrier comprising:
   $a_1$) a first cavity having a curved surface with a first portion located near said electrode, said first cavity having predetermined dimensions;
   $b_1$) a second cavity having predetermined dimensions; said second cavity having a curved surface with a portion thereof in alignment with a second portion of said curved surface of said first cavity;
   $c_1$) a third cavity have predetermined dimensions; said third cavity having a curved surface with a portion thereof in alignment with a second portion of said curved surface of said first cavity;
   $d_1$) a first groove having a predetermined shape and a predetermined depth and running along said top surface of said wafer and intercepting said second cavity at a first location thereat; and e₁) a second groove having a predetermined shape and a predetermined depth and running along said top surface of said wafer and intercepting said third cavity at a first location thereat;

said optical coupling arrangement couples light streams to and from a resonator disk dimensioned to snugly fit into said first cavity and comprises:

a₁) a first prism dimensioned to snugly fit into said second cavity;

b₂) a second prism dimensioned to snugly fit into said third cavity;

c₃) a first collimating fiber dimensioned to snugly fit into and run along and occupy said first groove; and d₁) a second collimating fiber dimensioned to snugly fit into and run along and occupy said second groove.

5. The apparatus according to claim 4, wherein said optical coupling arrangement further comprises:

f₂) a first focusing lens dimensioned to snugly fit into said first groove and to be interposed between said first collimating fiber and said first location of said second cavity; and g₂) a second focusing lens dimensioned to snugly fit into said second groove and to be interposed between said second collimating fiber and said first location of said third cavity.

6. The apparatus according to claim 5, wherein said carrier further comprises:

f₁) a third groove having a predetermined shape and predetermined dimensions and running along said top surface of said wafer and intercepting said second cavity at a second location thereat; and g₁) a fourth groove having a predetermined shape and predetermined dimensions and running along said top surface of said wafer and intercepting said third cavity at a second location thereat.

7. The apparatus according to claim 6, wherein said optical coupling arrangement further comprises:

h2) a first tuning rod dimensioned to snugly fit into said third groove and extend into said first location of said second cavity so as to abut against said first prism; and h3) a second tuning rod dimensioned to snugly fit into said fourth groove and extend into said first location of said third cavity so as to abut against said first prism.

8. The apparatus according to claim 6 wherein:

said wafer is composed of silicon and has thickness of about 0.5 mm;

said first cavity is dimensioned to have a diameter of about 5 mm and a depth of about 50 um;

said second cavity is dimensioned to have a trapezoidal shape and dimensions of a base of about 1.1 mm, and a top opening of about 0.6 mm;

said third cavity is dimensioned to have a trapezoidal shape and dimensions of a base of about 1.1 mm, and a top opening of about 0.6 mm;

said first groove has a U-shape and a depth of at least about 250 um;

said second groove has a U-shape and a depth of at least about 250 um;

said third groove has a width of at least about 0.3 mm;

said fourth groove has a width of at least about 0.3 mm;

said first prism has dimensions of about 1.0×0.5×0.5 mm; and said second prism has dimensions of about 1.0×0.5×0.5 mm.

9. The apparatus according to claim 8, wherein said focusing lens running in said second first groove is a ball lens having a radius of curvature of about 230 um and a distance within said first groove separating said first collimating fiber and said first prism is about 1700 um.

10. The apparatus according to claim 8, wherein said first and second prisms each has a coupling face with a normal end located in front of said resonant disk and each prism has a reflective index $n_{prism}$ of about 2.4, and said resonant disk has a reflective index $n_{disk}$ of about 2.14, and said first and second grooves are dimensions, so as to provide angles of incidence θ equal to arc $\sin(n_{disk}/n_{prism})$ of about 63 degrees relative to said normal of each of said first and second prisms.

11. The apparatus according to claim 4, wherein said first cavity has a resonator disk inserted therein, and having a top surface with a predetermined height, said resonator disk having a second electrode thereon on its top surface, said top surface of said carrier supporting said first electrode having a thickness selected so that said first and second electrodes are located at substantially the same height.

12. A method providing a carrier particularly suited for microphotonic devices and comprising a wafer with a predetermined thickness and providing a top surface for supporting an electrode, said method comprising the steps of:

a) providing a first cavity in said wafer and having a curved surface with first, second and third portions all interconnected with each other in a closed loop manner, said first portion located near said electrode, said first cavity having predetermined dimensions;

b) providing a second cavity in said wafer and having predetermined dimensions, said second cavity having a curved surface with a portion thereof in alignment with said second portion of said curved surface of said first cavity;

c) providing a third cavity in said wafer and having predetermined dimensions, said third cavity having a curved surface with a portion thereof in alignment with said third portion of said curved surface of said first cavity;

d) providing a first groove in said wafer and having a predetermined shape and a predetermined depth and running along said top surface of said wafer and intercepting said second cavity at a first location thereat; and e) providing a second groove in said wafer and having a predetermined shape and a predetermined depth and running along said top surface of said wafer and intercepting said third cavity at a first location thereat.

13. The method according to claim 12, further comprising the steps of:

f) providing a third groove in said wafer and having a predetermined shape and predetermined dimensions and running along said top surface of said wafer and intercepting said second cavity at a second location thereat; and g) providing a fourth groove in said wafer and having a predetermined shape and predetermined dimensions and running along said top surface of said wafer and intercepting said third cavity at a second location thereat.

14. The method according to claim 13 wherein:

said wafer is composed of silicon and has thickness of about 0.5 mm;

said first cavity is dimensioned to have a diameter of about 5 mm and a depth of about 50 um;

said second cavity is dimensioned to have a trapezoidal shape and dimensions of a base of about 1.1 mm, and a top opening of about 0.6 mm;

said third cavity is dimensioned to have a trapezoidal shape and dimensions of a base of about 1.1 mm, and a top opening of about 0.6 mm;

said first groove has a U-shape and a depth of at least about 250 mm;

said second groove has a U-shape and a depth of at least about 250 mm;

said third groove has a width of at least about 0.3 mm; and said fourth groove has a width of at least about 0.3 mm.

15. The method according to claim 13, wherein said providing steps a, b, c, d, e, f, and g are accomplished by a wet etching process.

16. A method of providing an apparatus for packaging and integrating microphotonic optical devices comprising providing a carrier and an optical coupling arrangement, said carrier having a wafer with a predetermined thickness and having a top surface for supporting a first electrode, said method for providing said carrier comprising the steps of:

$a_1$) providing a first cavity in said wafer and having a curved surface with a first portion thereof located near said electrode, said cavity having predetermined dimensions;

$b_1$) providing a second cavity in said wafer and having predetermined dimensions, said second cavity having a curved surface with a portion thereof in alignment with a second portion of said curved surface of said first cavity;

$c_1$) providing a third cavity in said wafer and having predetermined dimensions, said third cavity having a curved surface with a portion thereof in alignment with a third portion of said curved surface of said first cavity;

$d_1$) providing a first groove having a predetermined shape and a predetermined depth and running along said top surface of said wafer and intercepting said second cavity at a first location thereat; and $e_1$) providing a second groove having a predetermined shape and a predetermined depth and running along said top surface of said wafer and intercepting said third cavity at a first location thereat;

said method for providing said optical coupling arrangement comprising the steps of:

$a_2$) inserting a resonator disk dimensioned so as to snugly fit into said first cavity;

$b_2$) inserting a first prism dimensioned so as to snugly fit into said second cavity;

$c_2$) inserting a second prism dimensioned so as to snugly fit into said third cavity;

$d_2$) inserting a first collimating fiber dimensioned so as to snugly fit into and run along and occupy said first groove; and $e_2$) inserting a second collimating fiber dimensioned so as to snugly fit into and run along and occupy said second groove.

17. The method according to claim 16, wherein said steps for providing said optical coupling arrangement further comprises the steps of:

$f_2$) inserting a first focusing lens dimensioned so as to snugly fit into said first groove and to be interposed between said first collimating fiber and said first location of said second cavity; and $g_2$) inserting a second focusing lens dimensioned so as to snugly fit into said second groove and to be interposed between said second collimating fiber and said first location of said third cavity.

18. The method according to claim 17, wherein said steps for providing said carrier further comprises the steps of:

$f_1$) providing a third groove in said wafer and having a predetermined shape and a predetermined depth and running along said top surface of said wafer and intercepting said second cavity at a second location thereat; and $g_1$) providing a third groove in said wafer and having a predetermined shape and a predetermined depth and running along said top surface of said wafer and intercepting said second cavity at a second location thereat.

19. The method according to claim 18, wherein said steps of providing said optical coupling arrangement further comprises the steps of:

$h_2$) inserting a first tuning rod dimensioned so as to snugly fit into said third groove and extend into said first location of said second cavity so as to abut against said first prism; and $i_2$) inserting a second tuning rod dimensioned so as to snugly fit into said fourth groove and extend into said first location of said second cavity so as to abut against said second prism.

20. The method according to claim 18, wherein said providing steps $a_1$, $b_1$, $c_1$, $d_1$, $e_1$, $f_1$, and $g_1$, are accomplished by a wet etching process.

21. The method according to claim 18, wherein:

said wafer is composed of silicon and has thickness of about 0.5 mm;

said first cavity is dimensioned to have a diameter of about 5 mm and a depth of about 50 um;

said second cavity is dimensioned to have a trapezoidal shape and dimensions of a base of about 1.1 mm, and a top opening of about 0.6 mm;

said third cavity is dimensioned to have a trapezoidal shape and dimensions of a base of about 1.1 mm, and a top opening of about 0.6 mm;

said first groove has a U-shape and a depth of at least about 250 um;

said second groove has a U-shape and a depth of at least about 250 um;

said third groove has a width of at least about 0.3 mm;

said fourth groove has a width of at least about 0.3 mm;

said first prism has dimensions of about 1.0×0.5×0.5 mm; and said second prism has dimensions of about 1.0×0.5×0.5 mm.

22. The method according to claim 20, wherein said focusing lens running in said second first groove is a ball lens having a radius of curvature of about 230 um and a distance within said first groove separating said first collimating fiber and said first prism is about 1700 um.

23. The method according to claim 20, wherein said first and second prisms each have a coupling face with a normal end located in front of said resonant disk and each prism has a reflective index $n_{prism}$ of about 2.4, and said resonant disk has a reflective index $n_{disk}$ of about 2.14, and said first and second grooves are dimensions, so as to provide angles of incidence θ equal or greater than to arc $\sin(n_{disk}/n_{prism})$ of about 63 degrees relative to said normal of said resonant disk.

24. A method of providing a carrier particularly suited for microphotonic devices and comprising a wafer with a predetermined thickness and providing a top surface for supporting an electrode, said method comprising the steps of:

a) providing a first cavity in said wafer having a resonant disk therein, and having a curved surface with a first portion located near said electrode, said wafer being composed of silicon and having a thickness of about 0.5 mm, said first cavity being dimensioned to have a diameter of about 5 mm and a depth of about 50 mm, wherein said resonator disk has a top surface with a predetermined height, said resonator disk having a second electrode thereon on its top surface, and wherein said top surface of said carrier supporting said first electrode is provided as having a thickness selected so that said first and second electrodes are located at substantially the same height;

b) providing a second cavity in said wafer and being dimensioned to have a trapezoidal shape and dimensions of a base of about 1.1 mm, and a top opening of about 0.6 mm, said second cavity having a curved surface with a portion thereof in alignment with a second portion of said curved surface of said first cavity;

c) providing a third cavity in said wafer and being dimensioned to have a trapezoidal shape and dimensions of a base of about 1.1 mm, and a top opening of about 0.6 mm, said third cavity having a curved surface with a portion thereof in alignment with a third portion of said curved surface of said first cavity;

d) providing a first groove in said wafer and being dimensioned to have an U-shape and a depth of at least about 250 um, said first groove running along said top surface of said wafer and intercepting said second cavity at a first location thereat;

e) providing a second groove in said wafer and being dimensioned to have an U-shape and a depth of at least about 250 um, said second groove running along said top surface of said wafer and intercepting said third cavity at a first location thereat;

f) providing a third groove in said wafer and having a width of at least about 0.3 mm and running along said top surface of said wafer and intercepting said second cavity at a second location thereat; and g) providing a fourth groove in said wafer and having a width of at least about 0.3 mm and running along said top surface of said wafer and intercepting said third cavity at a second location thereat.

\* \* \* \* \*